US011297132B2

(12) United States Patent
Sun et al.

(10) Patent No.: US 11,297,132 B2
(45) Date of Patent: Apr. 5, 2022

(54) METHODS AND DEVICES FOR ORCHESTRATING SELECTION OF A MULTI-ACCESS EDGE COMPUTING SERVER FOR A MULTI-CLIENT APPLICATION

(71) Applicant: Verizon Patent and Licensing Inc., Basking Ridge, NJ (US)

(72) Inventors: Dan Sun, Bridgewater, NJ (US); Weimin Liu, Chatham, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/918,823

(22) Filed: Jul. 1, 2020

(65) Prior Publication Data
US 2022/0006857 A1   Jan. 6, 2022

(51) Int. Cl.
| | |
|---|---|
| *H04L 29/08* | (2006.01) |
| *G06N 5/04* | (2006.01) |
| *G06N 20/00* | (2019.01) |
| *H04L 29/06* | (2006.01) |
| *H04L 67/101* | (2022.01) |
| *H04L 67/289* | (2022.01) |
| *H04L 67/288* | (2022.01) |
| *H04L 67/1031* | (2022.01) |
| *H04L 67/01* | (2022.01) |

(52) U.S. Cl.
CPC ............ *H04L 67/101* (2013.01); *G06N 5/04* (2013.01); *G06N 20/00* (2019.01); *H04L 67/1031* (2013.01); *H04L 67/288* (2013.01); *H04L 67/289* (2013.01); *H04L 67/42* (2013.01)

(58) Field of Classification Search
CPC ...................................................... H04L 43/06
See application file for complete search history.

(56) References Cited

U.S. PATENT DOCUMENTS

| | | | | |
|---|---|---|---|---|
| 9,654,360 | B1 * | 5/2017 | Kellicker | H04L 43/045 |
| 10,986,036 | B1 * | 4/2021 | Wei | H04L 41/0806 |
| 2021/0126840 | A1 * | 4/2021 | Venkataramu | H04L 61/1511 |
| 2021/0153041 | A1 * | 5/2021 | Parvataneni | H04W 24/02 |
| 2021/0168027 | A1 * | 6/2021 | Parulkar | G06F 9/5072 |

* cited by examiner

*Primary Examiner* — Oleg Survillo
*Assistant Examiner* — Christopher P Cadorna

(57) ABSTRACT

An exemplary multi-access edge computing (MEC) orchestration system obtains an operation parameter of a multi-client application that is to execute on a MEC server to be selected from a set of MEC servers located at a first set of locations within a coverage area of a provider network. When executing, the multi-client application serves respective client applications of a set of client devices located at a second set of locations within the coverage area. Based on the operation parameter, the MEC orchestration system identifies a candidate subset of MEC servers from the set of MEC servers and directs the set of client devices to test and report performance capabilities of the MEC servers in the candidate subset. Based on the reported performance capabilities, the MEC orchestration system selects, from the candidate subset of MEC servers, a particular MEC server on which the multi-client application is to execute.

20 Claims, 10 Drawing Sheets

METHODS AND DEVICES FOR ORCHESTRATING SELECTION OF A MULTI-ACCESS EDGE COMPUTING SERVER FOR A MULTI-CLIENT APPLICATION

BACKGROUND INFORMATION

Modern computing commonly employs distributed computing architectures in which processing required by individual computing devices (e.g., mobile devices such as smartphones and tablets, Internet of Things (IoT) devices, consumer and business personal computers, etc.) is not performed exclusively by local computing resources of the devices themselves, but, rather, is at least partially performed by computing resources located elsewhere. Such distributed computing architectures may increase the efficiency of processing that is performed because powerful computing resources shared by many devices can be concentrated and managed at a single site rather than being replicated in each device. Additionally, distributed computing architectures may enable computing devices to readily engage in multi-client applications (e.g., multi-player games, communication applications, etc.), to perform complex processing tasks that would be difficult or impossible using only the modest local resources of the devices themselves, and so forth.

As distributed computing architectures grow in popularity, distributed computing resources are increasingly moving from a relatively small number of enormous cloud computing server farms to be implemented at a larger number of nodes closer to the edge of provider networks. For example, multi-access edge computing (MEC) servers at each of these nodes may be physically closer to the devices being served so that latencies may be reduced and greater scalability and efficiency may be achieved. With so many MEC servers standing ready to provide computing services to client devices on a given provider network, however, it has become a challenge to optimize the selection of which MEC server is to be assigned to which distributed application. This challenge can be particularly difficult for multi-client applications that have different goals and involve different client devices used by different users located in different places.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
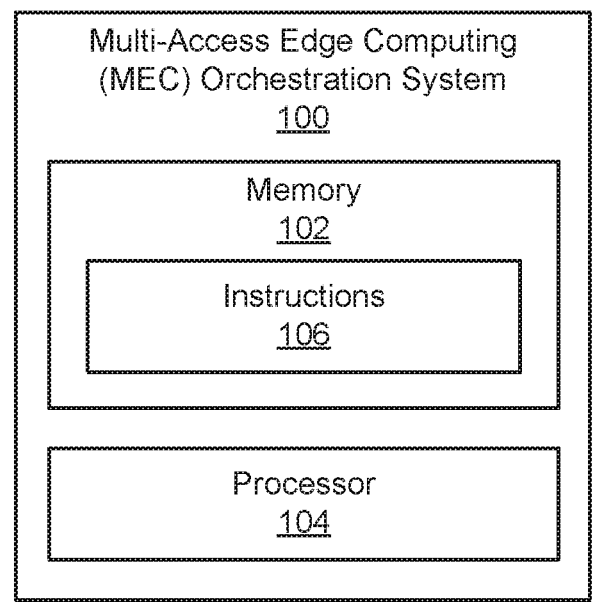
FIG. 1 shows an illustrative multi-access edge computing (MEC) orchestration system for orchestrating selection of a MEC server for a multi-client application according to embodiments described herein.

Methods and systems for orchestrating selection of a multi-access edge computing (MEC) server for a multi-client application are described herein. As described above, a provider network (e.g., a nationwide or global wireless provider network) may include significant MEC resources implemented on various MEC servers distributed to various MEC nodes throughout the network. For example, Service Access Points (SAPs), Transport Access Points (TAPs), Radio Access Networks (RANs), and/or other components within the provider network, as well as distributed computing nodes associated with other networks such as peering networks or the Internet, may all serve as potential MEC nodes to which the computing resources of MEC servers are distributed. As used herein, a MEC server may refer to various computing resources at a given MEC node, whether those resources are integrated into a single server computer or a plurality of server computers operating at the same site or as part of the same MEC node.

For a provider network that includes or can provide access to a large number of MEC servers each having different performance capabilities and being located at different geographical locations, it may be challenging to select an optimal MEC server to fulfill a particular service request or to execute a particular application. This challenge may be particularly difficult when the request involves a multi-client application (e.g., a multi-player video game or extended reality experience, a group video conferencing application or other communication application, etc.) that is configured to exchange data with respective applications executing on multiple client devices located at different places within the coverage area of the network, and that has its own optimization policy dictating what characteristics an ideal or desirable MEC server selection would have.

For example, for certain multi-client applications, it may be desirable to employ an optimization policy in which the client devices each have the smallest latency (e.g., round-trip latency, one-way latency, etc.) to the MEC server possible, or where the largest such latency of all the client devices is minimized. Such policies will be referred to herein as latency minimization optimization policies. For other multi-client applications, it may be desirable to employ optimization policies in which each client device has a same (or as similar as possible) latency to the MEC server as other client devices, even if that means that the latency of certain client devices is larger than it would otherwise have to be. Such policies will be referred to herein as a latency equalization optimization policies. As will be described in more detail below, other multi-client applications may have other types of optimization policies (e.g., policies based on other types of performance parameters besides latency, etc.).

Moreover, for any multi-client application associated with an optimization policy, it may be desirable that the MEC server ultimately selected to execute the multi-client application be capable of operating with at least a baseline minimum performance with respect to one or more different operation parameters. For example, this baseline minimum performance may be required for the MEC server to properly execute the multi-client application and serve the client devices adequately. Such performance requirements further add to the complexity of various MEC server selection scenarios.

Methods and systems described herein are configured to orchestrate selection of MEC servers for multi-user applications in various ways to flexibly and dynamically account for various factors and complexities such as those described above, as well as to account for various potential optimization policies that may be deemed most appropriate or desirable for particular multi-client applications. As one example, a gaming application will be considered in which multiple users in various geographic locations (e.g., locations across the country or world) are engaging together in a competitive multi-player action game (e.g., a first person shooter game in which the players are on different teams). If a MEC server is selected that is significantly closer to one of the players than another such that the first player has shorter latency to the selected MEC server than the second player, the first player may receive a significant and unfair advantage in the game. Similar unfair advantages could arise in other types of gaming or extended reality (e.g., virtual reality, augmented reality, etc.) applications, online betting applications, trading applications, shopping or auction applications, and various other types of multi-client applications.

Performance discrepancies between users may also be undesirable even when fair play of the application is not necessarily at stake. For example, when a group of people are participating in a video conference call, it may be desirable that each person receive approximately equal performance so that everyone can participate equally, rather than, for example, making it difficult for certain participants to engage in real-time communication on the conference call due to these participants happening to have longer latency to the selected MEC server (e.g., due to the participants being located farther away from the selected MEC server than the other participants). By orchestrating selection of MEC servers for multi-user applications in accordance with principles described herein, MEC architectures may be made to be highly effective and efficient in providing service to multiple client devices, provider networks may be made to operate efficiently, and/or end users of multi-client applications may be provided with enjoyable and fair experiences when using multi-client applications.

Various specific embodiments will now be described in detail with reference to the figures. It will be understood that the specific embodiments described below are provided as non-limiting examples of how various novel and inventive principles may be applied in various situations. Additionally, it will be understood that other examples not explicitly described herein may also be captured by the scope of the claims set forth below. MEC orchestration methods and systems described herein may provide any of the benefits mentioned above, as well as various additional and/or alternative benefits that will be described and/or made apparent below.

FIG. 1 shows an illustrative MEC orchestration system 100 (system 100) for orchestrating selection of a MEC server for a multi-client application according to principles described herein. System 100 may be implemented by computer resources such as servers, processors, memory devices, storage devices, communication interfaces, and so forth. For example, system 100 may be included within or otherwise associated with any of the MEC servers or other multi-access computing systems (e.g., cloud servers, local servers, etc.) described herein. As such, a computing system implementing system 100 may be configured to process data from distributed sources, to perform distributed services, and/or otherwise to provide computing resources to client devices such as desktop or laptop computers, mobile devices, Internet of Things (IoT) devices, and so forth.

As shown, system 100 may include, without limitation, a memory 102 and a processor 104 selectively and communicatively coupled to one another. Memory 102 and processor 104 may each include or be implemented by computer hardware that is configured to store and/or execute computer software. Various other components of computer hardware and/or software not explicitly shown in FIG. 1 may also be included within system 100. In some examples, memory 102 and processor 104 may be distributed between multiple devices and/or multiple locations as may serve a particular implementation.

Memory 102 may store and/or otherwise maintain executable data used by processor 104 to perform any of the functionality described herein. For example, memory 102 may store instructions 106 that may be executed by processor 104. Memory 102 may be implemented by one or more memory or storage devices, including any memory or storage devices described herein, that are configured to store data in a transitory or non-transitory manner. Instructions 106 may be executed by processor 104 to cause system 100 to perform any of the functionality described herein. Instructions 106 may be implemented by any suitable application, software, code, and/or other executable data instance. Additionally, memory 102 may also maintain any other data accessed, managed, used, and/or transmitted by processor 104 in a particular implementation.

Processor 104 may be implemented by one or more computer processing devices, including general purpose processors (e.g., central processing units (CPUs), graphics processing units (GPUs), microprocessors, etc.), special purpose processors (e.g., application specific integrated circuits (ASICs), field-programmable gate arrays (FPGAs), etc.), or the like. Using processor 104 (e.g., when processor 104 is directed to perform operations represented by instructions 106 stored in memory 102), system 100 may perform various functions associated with orchestrating selection of a MEC server for a multi-client application in any manner described herein or as may serve a particular implementation.

Figure 2:
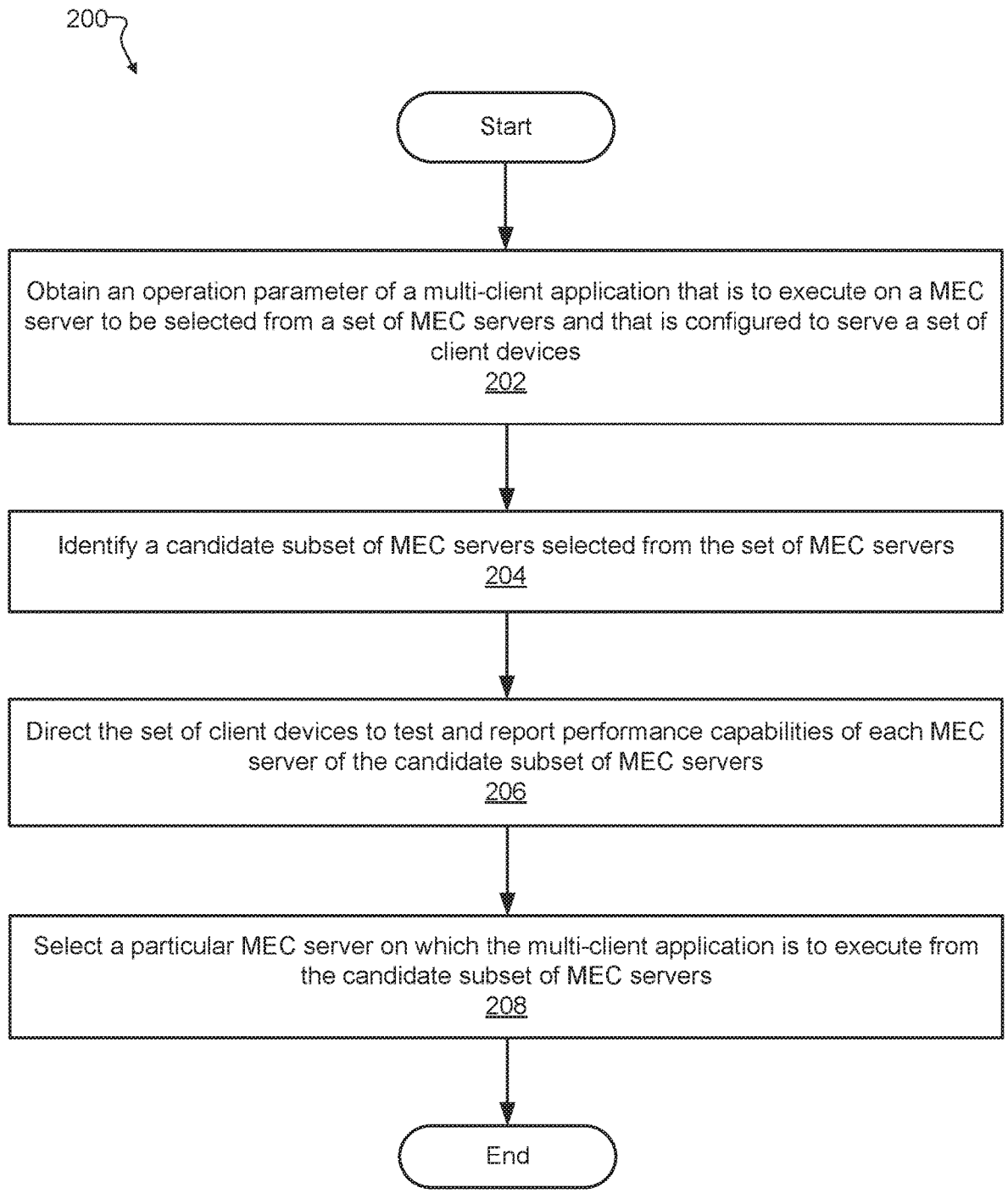
FIG. 2 shows an illustrative MEC orchestration method for orchestrating selection of a MEC server for a multi-client application according to embodiments described herein.

FIG. 2 shows an illustrative MEC orchestration method 200 (method 200) for orchestrating selection of a MEC server for a multi-client application in accordance with principles described herein. While FIG. 2 shows illustrative operations according to one embodiment, other embodiments may omit, add to, reorder, and/or modify any of the operations shown in FIG. 2. In some examples, multiple operations shown in FIG. 2 or described in relation to FIG. 2 may be performed concurrently (e.g., in parallel) with one another, rather than being performed sequentially as illustrated and/or described. One or more of the operations shown in FIG. 2 may be performed by a MEC orchestration system such as system 100 and/or any implementation thereof.

In some examples, the operations of FIG. 2 may be performed in real-time so as to provide, receive, process, and/or use data described herein immediately as the data is generated, updated, changed, exchanged, or otherwise becomes available. As a result, system 100 may be configured to perform MEC server selection operations described herein on demand, thereby selecting MEC servers and beginning execution of requested tasks (e.g., execution of multi-client applications, etc.) immediately upon request. Real-time operations will be understood to be performed immediately and without undue delay, even if it is not possible for there to be absolutely zero delay.

At operation 202, system 100 may obtain one or more operation parameters of a multi-client application. The multi-client application may be implemented as instructions that are to execute on a MEC server and that is configured, when executing, to serve respective client applications executing on a set of client devices. For example, the multi-client application may be implemented as a multi-player video game (e.g., an online first person shooter game) that executes on the MEC server and communicates to corresponding applications executing on each client device in the set of client devices to allow users of the client devices to all play the game together. As another example, the multi-client application may be implemented as a communication application that executes on the MEC server and serves as a hub to allow users of the client devices to all communicate with one another such as in a group audio or video conference (e.g., for a business conference call, for a virtual event such as a virtual wedding or graduation, etc.). In still other examples, the multi-client application may be implemented by software that allows the set of users to watch or engage in online competitions (e.g., eSports competitions, etc.), participate in online gambling, make real-time stock trades, or enjoy various other types of applications and use cases as may serve a particular implementation.

The MEC server that is to execute the multi-client application may be selected from a set of MEC servers located at a first set of locations within a coverage area of a provider network, while the set of client devices may be located at a second set of locations within the coverage area. As such, the particular MEC server that is used (from the set of MEC servers distributed around the provider network) to execute the multi-client application may have a significant effect on the experience that users of the set of client devices will have as they engage with the multi-client application.

For example, if all of the client devices are located in one region of the coverage area (e.g., along the west coast in a coverage area that covers the United States), it may be undesirable for the selected MEC server to be located in a completely different region of the coverage area (e.g., along the east coast of the coverage area covering the United States) because such long distances may cause undesirable performance of the multi-client application (e.g., round trip latencies that are too long and cause perceptible and distracting delays, etc.). As another example, if the client devices are distributed to various regions across the coverage area (e.g., to include locations on both west and east coasts in the coverage area example that covers the United States), it may be undesirable for the selected MEC server to be located much nearer to some of the client devices than to others (e.g., as would be the case if the selected MEC server were located on the west coast) because this may create a situation where different users experience significantly different performance during the multi-client application (e.g., short latencies for client devices on the west coast and longer latencies for client devices on the east coast).

Accordingly, part of the role of system 100 may be to attempt to select a MEC server that has suitable performance characteristics both in terms of inherent processing capability and in terms of geographic location (e.g., since, as illustrated by these examples, the location may have an effect on performance characteristics such as latency). To this end, one or more operation parameters obtained at operation 202 may define key performance indicators (e.g., computing resource requirements, target values, thresholds, etc.) for various aspects of the performance of the multi-client application. For example, an uplink bandwidth parameter and/or a downlink bandwidth parameter for the multi-client application may be obtained at operation 202 and may define what communication bandwidth the selected MEC server is to have available in order to properly serve the number of clients participating in the multi-client application. Other operation parameters obtained at operation 202 may define a number of CPU cores and/or GPU cores that the multi-client application is configured to use, an amount of available memory or disc storage space that the multi-client application requires for proper operation, an amount of packet loss and/or jitter that the multi-client application can tolerate (e.g., a packet loss parameter for the multi-client application and a packet jitter parameter for the multi-client application, respectively), and/or other such key performance indicators for the multi-client application.

Certain operational parameters obtained by system 100 at operation 202 may also relate to tolerable latencies of the multi-client application (e.g., a round-trip latency parameter or one-way latency parameter for the multi-client application that define maximum acceptable latencies that each client device may experience, a latency disparity parameter for the multi-client application that defines a maximum latency difference across all of the client devices, etc.). Moreover, the operational parameters obtained at operation 202 may indicate the locations and/or addresses of the client devices. For example, the operational parameters may represent an Internet Protocol (IP) address for each client device in the set of client devices. Certain operational parameters obtained by system 100 at operation 202 may also define an optimization policy associated with the multi-client application (e.g., any of the optimization policies mentioned above or as will be described herein). Any of these or various other suitable operational parameters may be obtained at operation 202 in any manner or from any source as may serve a particular implementation.

At operation 204, system 100 may identify a candidate subset of MEC servers selected from the set of MEC servers. For example, if the set of MEC servers includes hundreds of possible MEC servers that could potentially be selected to execute the multi-client application, operation 204 includes narrowing down the candidate pool to a smaller number of potential MEC servers such as a candidate subset that includes ten MEC servers, three MEC servers, or the like. The identification of the candidate subset of MEC servers at operation 204 may be performed based on one or more operational parameters obtained at operation 202. For example, as will be described in more detail below, the candidate subset of MEC servers may be identified to include only MEC servers that meet various key performance indicators defined by the operational parameters and that are in suitable locations with respect to the locations of the set of client devices (e.g., accounting for the optimization policy in certain examples).

At operation 206, system 100 may direct the set of client devices to test and report performance capabilities of each MEC server of the candidate subset of MEC servers. For example, as will be described in more detail below, each client device may exchange messages with each candidate MEC server to determine one-way and/or round trip latencies that the client device has with the MEC server, as well as to determine how much processing and/or communication bandwidth each candidate MEC server currently has available. System 100 may also determine certain performance capabilities by reference to a data store (e.g., a database, etc.) that maintains known statistics for each MEC server in the set of MEC servers such as the location of each MEC server, the overall processing resources (e.g., the number and type of CPU cores, the number and type of GPU cores, the amount and type of memory, etc.) included in each MEC server, and so forth. Data determined from tests at operation 206 may be reported by the client devices back to system 100 so that system 100 may take the information into account at operation 208.

At operation 208, system 100 may select a particular MEC server, from the candidate subset of MEC servers identified at operation 204, on which the multi-client application is to execute. For example, the selection of the particular MEC server may be performed based on the reported performance capabilities that the client devices were directed to test and report on at operation 206. The particular MEC server may also be selected in accordance with a desired optimization policy obtained at operation 202. As will be described in more detail below, once the particular MEC server that is to execute the multi-client application has been selected at operation 208, system 100 may proceed to instantiate the multi-client application on the selected MEC server and the execution of the multi-client application may begin.

Figure 3:
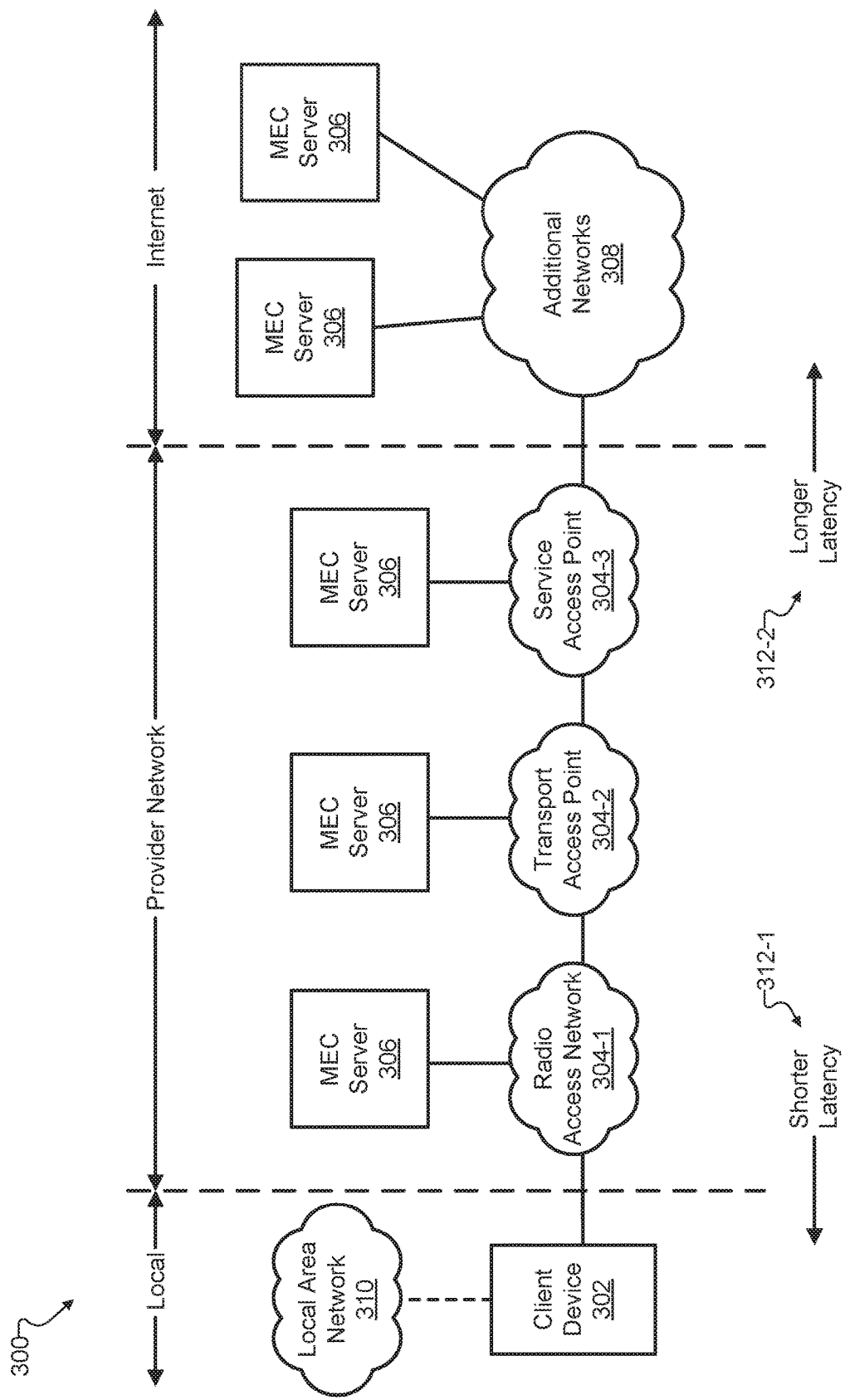
FIG. 3 shows an illustrative network architecture within which the MEC orchestration system of FIG. 1 may be deployed according to embodiments described herein.

FIG. 3 shows an illustrative network architecture 300 within which system 100 may be deployed according to principles described herein. As shown in FIG. 3, network architecture 300 is divided into three domains of communication that each may include zero or more communication networks. More specifically, a client device 302 (e.g., a desktop or laptop computer, a mobile device such as a smartphone or tablet, an IoT device or other embedded system, another type of user equipment device, etc.) is shown to be included in a local domain of communication (Local) and to communicate with systems and devices included within both a provider network communication domain (Provider Network) and an Internet communication domain (Internet).

The provider network may be implemented as a provider-specific wired or wireless communications network (e.g., a cellular network used for mobile phone and data communications, a 5G network or network of another suitable technology generation, a cable or satellite carrier network, a mobile telephone network, a traditional telephone network, etc.), and may be operated and managed by a provider entity such as a mobile network operator (e.g., a wireless service provider, a wireless carrier, a cellular company, etc.). The provider of the provider network may own or control all of the elements necessary to deliver communications services to users of user equipment devices such as client device 302, including radio spectrum allocation, wireless network infrastructure, back haul infrastructure, customer care, provisioning of devices, and so forth.

As shown, the provider network may include or consist of various network resources 304 (e.g., network resources 304-1 through 304-3) each associated with one or more MEC servers 306 (while one MEC server 306 is illustrated for each network resource 304 in FIG. 3, it will be understood that a plurality of MEC servers 306 may be associated with each network resource 304 in certain implementations). For example, as shown, one or more radio access network (RAN) resources 304-1 may directly communicate with client device 302 and may provide access to one or more integrated MEC servers 306. Similarly, one or more transport access point (TAP) resources 304-2 may communicate with client device 302 indirectly (e.g., by way of RAN resources 304-1) and may provide access to one or more additional integrated MEC servers 306. Additionally, one or more service access point (SAP) network resources 304-3 may communicate with client device 302 indirectly (e.g., by way of RAN resources 304-1 and TAP resources 304-2) and may provide access to still other integrated MEC servers 306. In some examples, other network resources (not explicitly shown) may likewise assist in providing communication services for client device 302 and/or may provide access to integrated MEC servers 306 in any manner as may serve a particular implementation.

As used herein, a MEC server may refer to any set of computing resources (e.g., a server, a blade server, an edge server, a set of servers at a single site, etc.) that is accessible to multiple client devices and distributed in a manner that puts the resources at the edge of a network (e.g., the provider network, a peering network, another network associated with the Internet, etc.) to limit latency times, backhaul demands, and so forth. A particular MEC server may include a set of co-located computing resources (e.g., processors, CPUs, GPUs, memory and communication resources, etc.) such that the computing resources all communicate with a particular client device 302 with a similar transport latency and such that the MEC server may be treated as a single, discrete entity for the purposes of MEC server selection by system 100.

FIG. 3 shows that client device 302 may also be communicatively coupled, by way of the provider network, with one or more additional networks 308 that are external to the provider network (e.g., on the Internet, as labeled in FIG. 3). As shown, a plurality of MEC servers 306 may be connected to these additional networks 308. For example, the additional networks 308 may be peer networks connected to the provider network by high bandwidth connections (e.g., direct fiber optic lines, etc.) and these MEC servers 306 may be operated on the peer networks. In some examples, the additional networks 308 may represent other networks beyond the provider network and the MEC servers 306 associated therewith may include cloud servers operated by cloud computing enterprises such as VERIZON (e.g., VERIZON Cloud), AMAZON (e.g., AMAZON Web Services (AWS)), MICROSOFT (e.g., MICROSOFT Azure), GOOGLE (e.g., GOOGLE Cloud Platform (GCP)), ORACLE (ORACLE Cloud), or the like.

As illustrated in network architecture 300, MEC servers 306 may be implemented as part of the provider network or additional networks and, hence, may be physically separated in space from client devices such as client device 302. As a result, these networks may provide data delivery between server-side provider systems (e.g., MEC servers 306 and/or other provider systems not explicitly shown) and client-side systems and devices (e.g., client devices such as client device 302). To this end, the provider network and the Internet may implement or employ any suitable communication technologies, devices, media, protocols, or the like as may serve a particular implementation.

Additionally, network architecture 300 further depicts a local area network (LAN) 310 that may be communicatively coupled with and configured to serve client device 302 within a local area in certain examples. In such examples, client device 302 may access LAN 310 by way of a Wi-Fi connection or the like, and may use LAN 310, in addition or as an alternative to the provider network, as a gateway to access the Internet. In certain examples, computing resources associated with LAN 310 (not explicitly shown) may also be configured to fulfill service requests for client device 302.

Indicators 312 (i.e., indicators 312-1 and 312-2) are shown in FIG. 3 to illustrate how latency between client device 302 and a particular MEC server 306 may be affected by which MEC server 306 is selected to perform a multi-client application. Specifically, as shown by indicator 312-1, MEC servers 306 nearer to client device 302 are generally associated with shorter latencies, while, as shown by indicator 312-2, MEC servers 306 farther from client device 302 are generally associated with longer latencies. It will be understood that total latency experienced by client device 302 with respect to a particular MEC server 306 may be a combination of transport latency (i.e., latency associated with travel time as data is transmitted over a physical distance between the client device and the MEC server) and compute latency (i.e., latency associated with processing time as data is processed using available resources of the MEC server). Accordingly, while the physical distance between client device 302 and a selected MEC server 306 may have a significant influence on the total latency performance, it will be understood that the physical distance is not the only factor that influences the total latency. Other factors that may determine latency besides geographical separation may include the access method of the client device (e.g., wireline, wireless, fiber, etc.), the number of routers network traffic must traverse through, network congestion, computing resource availability at the MEC server, and so forth. It will be understood that while shorter latencies are considered to be preferable to longer latencies in many situations, it may not be desirable in every situation for client device 302 to have the shortest possible latency with a selected MEC server 306. For example, as will be described in more detail below, certain optimization policies may prioritize latency equality between client devices rather than minimum latency of each client device.

Figure 4:
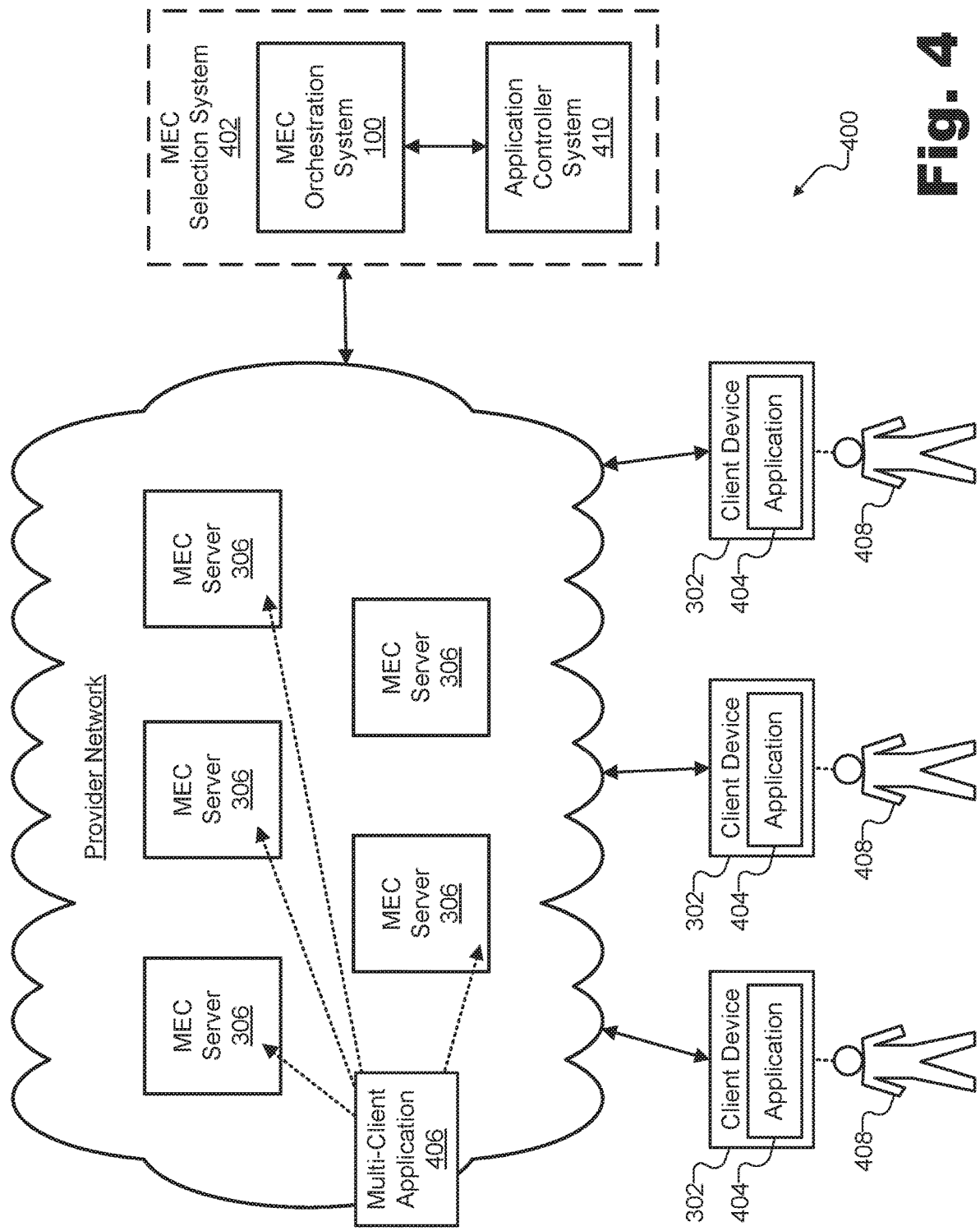
FIG. 4 shows an illustrative configuration within which an illustrative MEC selection system orchestrates selection of a MEC server for a multi-client application according to embodiments described herein.

FIG. 4 shows an illustrative configuration 400 within which an illustrative MEC selection system 402 orchestrates selection of a MEC server 306 for a multi-client application according to principles described herein.

As shown, configuration 400 includes a plurality of client devices 302 such as the one described above in relation to FIG. 3. While three client devices 302 are shown in configuration 400 for illustrative purposes, it will be understood that any suitable number of client devices 302 may be present in a given configuration. For example, hundreds or thousands of client devices 302 of different types may all be connected to a provider network (e.g., a nationwide provider network) and configured to interoperate as part of a single multi-client application.

A respective application 404 is shown to be executing on each client device 302. Applications 404 may correspond to a multi-client application 406 that will execute on a particular MEC server 306 to be selected by MEC selection system 402 (e.g., as orchestrated by system 100). In this way, respective users 408 associated with (e.g., using, controlling, etc.) client devices 302 may interact with one another as all of the users 408 engage together with multi-client application 406 by way of their respective instances of application 404 executing on their individual client devices 302.

As further shown, client devices 302 may each be communicatively coupled to a provider network including a set of MEC servers 306 such as were described above in relation to FIG. 3. It will be understood, as described above, that certain MEC servers 306 may also be associated with networks external to the provider network, although such MEC servers are not explicitly illustrated in FIG. 4. Dotted arrows indicate that at least some (although not necessarily all) of the MEC servers 306 in the set of MEC servers included within the provider network are computationally and communicationally capable of executing an instantiation of multi-client application 406. It will be understood that a single MEC server 306 (e.g., a MEC server 306 that is selected by MEC selection system 402) may execute multi-client application 406 while other MEC servers 306 that are not selected may continue to be available to perform other tasks (e.g., to serve other client devices, to execute other multi-client applications, etc.).

MEC selection system 402 may be integrated into the provider network by being implemented by computing resources of a network component such as one or more of MEC servers 306. Alternatively, as shown in configuration 400, MEC selection system 402 may be implemented by computing resources distinct from those of the provider network and may be communicatively coupled with the provider network in a similar manner as client devices 302. In either case, MEC selection system 402 may have communicative access to client devices 302 and to MEC servers 306 so that MEC selection system 402 may perform its role of selecting a suitable or optimal MEC server 306 to execute a particular multi-client application (e.g., multi-client application 406).

MEC selection system 402 is shown to include an implementation of system 100 (described above), as well as an implementation of an application controller system 410. With these component subsystems, MEC selection system 402 may perform MEC selection or orchestration methods such as method 200. For example, in one implementation of MEC selection system 402, application controller system 410 may be configured to transmit an orchestration request for selection of a MEC server 306 (from the set of MEC servers 306 located within the coverage area of the provider network), and to provide (e.g., as part of the orchestration request) an operation parameter of the multi-client application 406 that is to execute on the selected MEC server. In this example, system 100 may be configured to: 1) receive the orchestration request transmitted by application controller system 410; 2) identify a candidate subset of MEC servers 306 (selected from the set of MEC servers 306) based on the operation parameter provided as part of the orchestration request; 3) direct the set of client devices 302 to test and report performance capabilities of each MEC server 306 of the candidate subset of MEC servers 306; and 4) select, from the candidate subset of MEC servers 306 and based on the reported performance capabilities, a particular MEC server 306 on which multi-client application 406 is to execute.

Along with these operations performed by system 100 and application controller system 410, MEC selection system 402 may be further configured to maintain data and/or perform other operations to facilitate orchestration of MEC server selection. For example, MEC selection system may be configured to track and maintain data representative of computing capabilities, physical locations, current computing loads, and/or other data corresponding to each of the MEC servers 306 in the set of MEC servers 306 so as be able to facilitate selection of MEC servers 306 to serve different situations, different optimization policies, and so forth.

Figure 5:
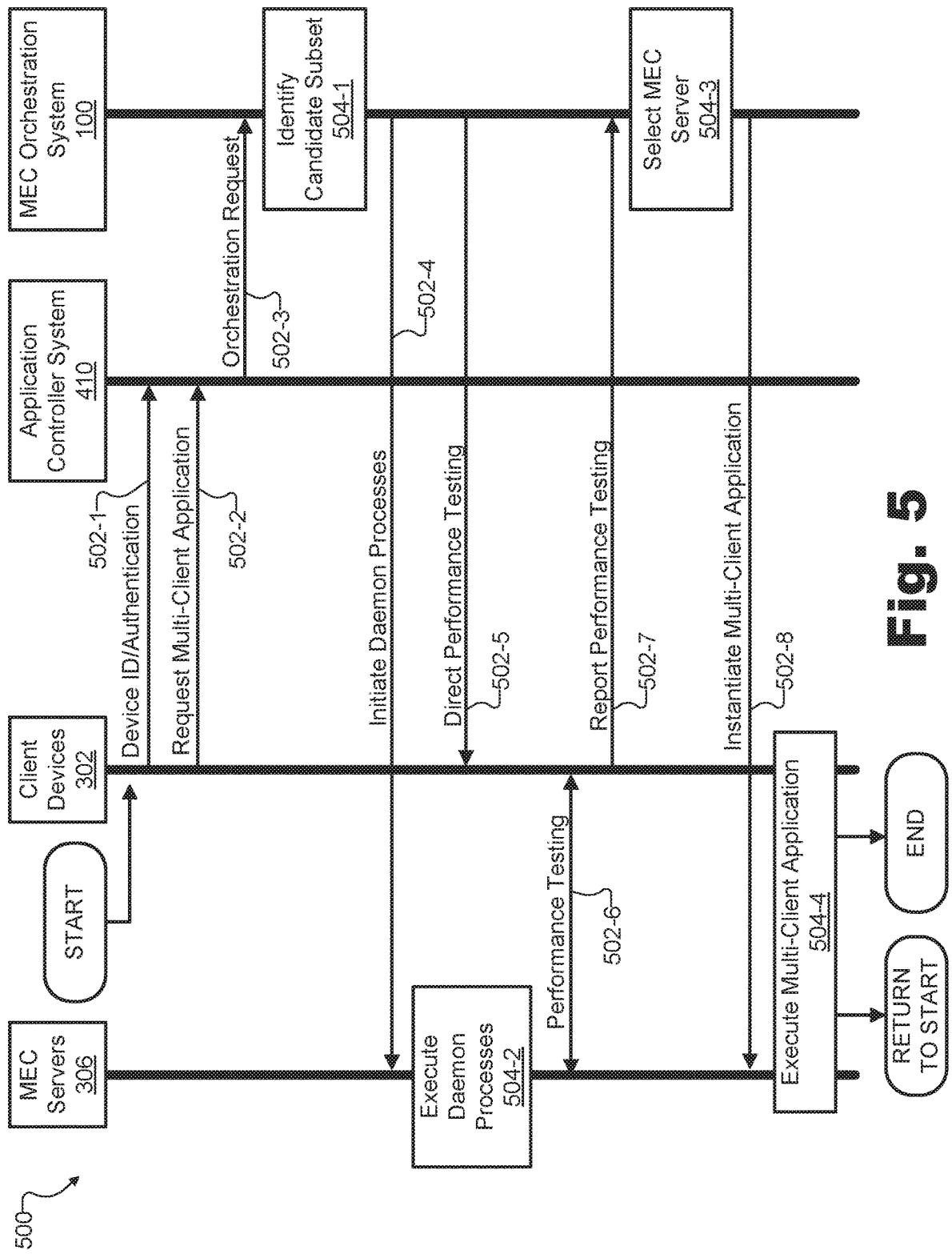
FIG. 5 shows an illustrative performance of operations and communications between components of FIG. 4 to orchestrate selection of a MEC server for a multi-client application according to embodiments described herein.

To illustrate in more detail how each of the components of configuration 400 interoperate and intercommunicate to orchestrate selection of a particular MEC server for a particular multi-client application, FIG. 5 shows an illustrative performance 500 of various operations and communications between component systems of configuration 400 (e.g., MEC servers 306, client devices 302, application controller system 404, and system 100). As time moves forward from the top of FIG. 5 to the bottom of FIG. 5, various communications 502 between the various component systems (e.g., communications 502-1 through 502-8) are shown along with various operations 504 that are performed by the component systems (e.g., operations 504-1 through 504-4). It will be understood that the order of communications 502 and operations 504 may vary from what is shown in performance 500, as well as that certain communications 502 and/or operations 504 may be performed concurrently in certain examples. Moreover, additional or fewer communications and/or operations may be employed in certain examples than what are shown in the example of performance 500. It will also be understood that operations (e.g., processing performed by a particular component system) may accompany some or all of communications 502 even if such operations are not explicitly shown in FIG. 5. Each of communications 502 and operations 504 shown in FIG. 5 will now be described in more detail.

As indicated by a START label in FIG. 5, performance 500 may begin with communication 502-1 between client devices 302 and application controller system 410. At communication 502-1, each of client devices 302 may join or register with application controller system 410 by providing identification and/or authentication data to identify themselves and verify their claimed identify. For example, each client device 302 may provide an IP address, a MAC address, a serial number or other device identifier, a current geographical location of the client device (e.g., determined by way of a global positioning system (GPS) sensor, network triangulation, etc.), a username and/or password, a digital certificate, and/or any other identification and/or authentication information as may serve a particular implementation. Based on the information received in communication 502-1, application controller system 410 may register each client device 302 that may be included within a set of client devices 302 that are to engage in a multi-client application.

At communication 502-2, one or more of client devices 302 may send a request to application controller system 410 to request that the multi-client application be instantiated (and/or to request that the client device 302 be enabled to engage with the multi-client application in the event that the multi-client application has already been instantiated). The request of communication 502-2 may include a request for application controller system 410 to submit an orchestration request to system 100 to initiate a process in which system 100 will orchestrate selection of a suitable MEC server 306 to host a multi-client application with which a set of client devices 302 are to engage.

Accordingly, at communication 502-3, application controller system 410 may transmit such an orchestration request to system 100. As part of the orchestration request of communication 502-3, application controller system 410 may provide one or more operation parameters of the multi-client application that is to execute on the MEC server 306 that is ultimately selected. For example, the orchestration request may include any of the operation parameters described herein such as a computing resource requirement for the multi-client application, the IP addresses of one or more of the client devices 302 that are to engage in the multi-client application, any suitable MEC server selection criteria for the multi-client application, or the like. The MEC server selection criteria may include, for example, any of the following or a combination thereof: a maximum latency to each client device 302, a maximum latency disparity to all client devices 302, an uplink or downlink bandwidth to be used by the multi-client application, a maximum packet loss parameter for the multi-client application, a maximum jitter parameter for the multi-client application, and/or any other key performance indicator or quality-of-service (QoS)-related parameter as may serve a particular implementation. The orchestration request of communication 502-3 may also include data representative of an optimization policy that is to be accounted for in the selection of the MEC server.

At operation 504-1, system 100 may identify, in response to receiving the orchestration request of communication 502-3 from application controller system 410, a subset of MEC servers 306 that are likely to be viable candidates for executing the multi-client application. This subset of MEC servers may be referred to herein as a candidate subset of MEC servers and may be identified in any suitable manner as may serve a particular implementation. For example, the identifying of the candidate subset of MEC servers at operation 504-1 may be based on the one or more operation parameters communicated in the orchestration request of communication 502-3, as well as one or more additional factors in certain examples. The additional factors upon which operation 504-1 may base the identification of the candidate subset of MEC servers may include any of the following factors or combination thereof: 1) a real-time availability of each MEC server 306 of the set of MEC servers 306; 2) an average proximity of each MEC server 306 to each client device 302; or 3) a centrality of a location at which each MEC servers 306 is located with respect to the set of locations at which the client devices 302 are located.

Each of these factors will now be described. The real-time availability of a MEC server 306 may refer to an how many CPU cores or GPU cores are currently in use on the MEC server 306, how much memory is currently in use, how much communication traffic the MEC server 306 is handling, and/or any other measure of resource availability of the MEC server 306 at the time that system 100 is orchestrating the MEC server selection. The average proximity of a MEC server 306 to client devices 302 may be determined based on an average of a respective distance between the MEC server 306 and each of the client devices 302 in the set of client devices 302. For example, if all of the client devices 302 are on the west coast of the United States, a MEC server 306 located on the west coast would be determined to have a closer average proximity to client devices 302 than would a MEC server 306 located on the east coast. The centrality of a location at which a MEC server 306 is located with respect to the locations of client devices 302 may be determined as a measure of how disparate the respective distances are between the MEC server 306 and each of the client devices 302. For example, if the respective distances between the MEC server 306 and each client device 302 are approximately the same (e.g., as would be the case if the locations of the client devices 302 formed a circle and the MEC server 306 was located at the center of the circle) the centrality factor may be determined to be higher than if the MEC server 306 is located near the perimeter or outside of the circle such that some client devices 302 are significantly closer to the MEC server 306 than others.

Each of the factors described above may be determined based on stored information related to the candidate subset of MEC servers 306 (e.g., information indicative of the MEC server locations, processing capabilities, etc.) and/or based on real-time testing that is performed in accordance with communications and operations described in more detail below. In certain implementations, system 100 may identify candidate MEC locations using a selection mechanism that is honed and trained over time using machine learning technologies. For example, the identifying of the candidate subset of MEC servers 306 at operation 504-1 may include analyzing at least one of the one or more factors described above using machine learning technology trained based on previous such identifications that have been made in the past and an indication of how optimal or successful such identifications turned out to be. By employing machine learning technologies in this way, system 100 may improve at identifying relevant MEC server candidates as the methods described herein are performed over and over for various client devices and multi-client applications.

Whether identified based on machine learning technologies, pre-programmed algorithms, or a combination of both, relevant MEC server candidates identified by system 100 at operation 504-1 may offer sufficient resources to satisfy the operation parameters of the multi-client application. (Whether a given candidate MEC server 306 has sufficient resources available at the current time may still be a matter for further testing, but the candidate MEC server 306 should have sufficient resources at least in theory.) Additionally, candidate MEC servers 306 identified at operation 504-1 may be selected either in accordance with a particular optimization policy that has been identified (e.g., that is provided in the orchestration request) or in a manner that allows for flexibility to meet different types of optimization policies that could be identified or modified in the future. For example, candidate MEC servers 306 that are expected to be optimal for a latency equalization optimization policy may be identified together with candidate MEC servers 306 that are expected to be optimal for a latency minimization optimization policy so that reorchestration of the MEC server selection (described in more detail below) may be performed without having to reidentify a candidate subset or retest each of the MEC servers included therein.

While certain information about candidate MEC servers 306 may be looked up in a data store (as described above), accurate real-time performance predictions may necessitate or be well-served by actual testing of interactions between client devices 302 and candidate MEC servers 306. To this end, system 100 may direct the set of client devices 302 to test and report performance capabilities of each candidate MEC server 306 under real-time network conditions. This directing of client devices 302 to perform the testing and reporting may be accomplished in any suitable manner. For example, at communication 502-4, system 100 may direct each MEC server 306 of the candidate subset of MEC servers 306 to execute one or more daemon processes configured to facilitate one or more tests to be performed by client devices 302. The daemon processes may be newly initiated if not already executing or, if the daemon processes are already executing, communication 502-4 may serve to ensure this fact. Daemon processes initiated (or checked to be executing) by communication 502-4 may include daemon processes such as ping, iperf, or any other suitable daemon process. Then, at operation 504-2, each of MEC servers 306 in the candidate subset of MEC servers 306 may execute (or continue executing) the daemon processes as directed by system 100.

Along with ensuring the execution of the daemon processes, the directing of client devices 302 to perform the testing and reporting may further include providing certain information to each of client devices 302. Specifically, at communication 502-5, system 100 may direct performance testing by not only instructing client devices 302 to perform certain tests, but also by providing the information needed by the client devices 302 to perform the tests. For example, at communication 502-5, system 100 may direct the performance testing by indicating which MEC servers 306 have been identified for the candidate subset of MEC servers, providing address information associated with each respective daemon process executing on each of the identified MEC servers, providing protocol information indicating a supported transport protocol that is to be utilized by client devices 302 to communicate with the respective daemon processes to enable testing of the performance capabilities, and so forth.

Accordingly, based on the provided instruction and information of communication 502-5, client devices 302 may proceed with performance testing of MEC servers 306. As shown, communication 502-6 is a two-way communication between client devices 302 and MEC servers 306 to represent the communications back and forth between the client devices and MEC servers as the performance testing is carried out. The performance testing of communication 502-6 may be used to determine the performance and quality of service that each of the candidate MEC servers 306 could currently be expected to provide to client devices engaged in a multi-client application, especially in terms of the operation parameters that application controller system 410 provided in the orchestration request. For example, the performance testing may be performed to reveal whether one or more operations parameters for the multi-client application are satisfied such as a round-trip latency parameter, a one-way latency parameter, an uplink bandwidth parameter, a downlink bandwidth parameter, a packet loss parameter, a packet jitter parameter, or any other operation parameter described herein or as may serve a particular implementation. Additionally, other key performance indicators may be tested such as indicators associated with goodput, bit errors, packet delay variation, out-of-order delivery, and so forth. It will be understood that the various tests represented by communication 502-6 between client devices 302 and MEC servers 306 may utilize the daemon processes executed at operation 504 and may be relatively straightforward tests (e.g., a ping test to measure round-trip latency) or more involved tests (e.g., a One-Way Active Measurement Protocol (OWAMP) used to measure one-way latency).

At communication 502-7, the client devices 302 in the set of client devices 302 may each report back to system 100 with the respective test results measured for each of the candidate MEC servers 306. Accordingly, system 100 may combine static data that has been accessed from a data store (e.g., data indicative of locations of MEC servers 306, theoretical capabilities of MEC servers 306, etc.) with real-time, dynamic test result data reported by client devices 302 (e.g., data indicative of how each MEC server 306 may be expected to perform with respect to the actual client devices 302 at their current locations and under current conditions).

Based on all this data and any other suitable data that system 100 may access or receive in a particular implementation, system 100 may perform operation 504-3, in which a particular MEC server 306 is selected from the candidate subset of MEC servers 306 to be the one that will execute the multi-client application. Along with ensuring that all of the relevant operation parameters requested for the multi-client application can be satisfied by the selected MEC server 306, operation 504-3 may be configured to select a MEC server in accordance with a particular optimization policy such as a latency equalization optimization policy, a latency minimization optimization policy, or another suitable optimization policy. For example, other optimization policies could include a policy that attempts to make the latency for each client device close to an average latency (e.g., a mean latency, a median latency, etc., rather than a minimum latency), a policy targeting a minimum or average of another of the operation parameters described herein (e.g., besides latency), or the like.

Figure 6:
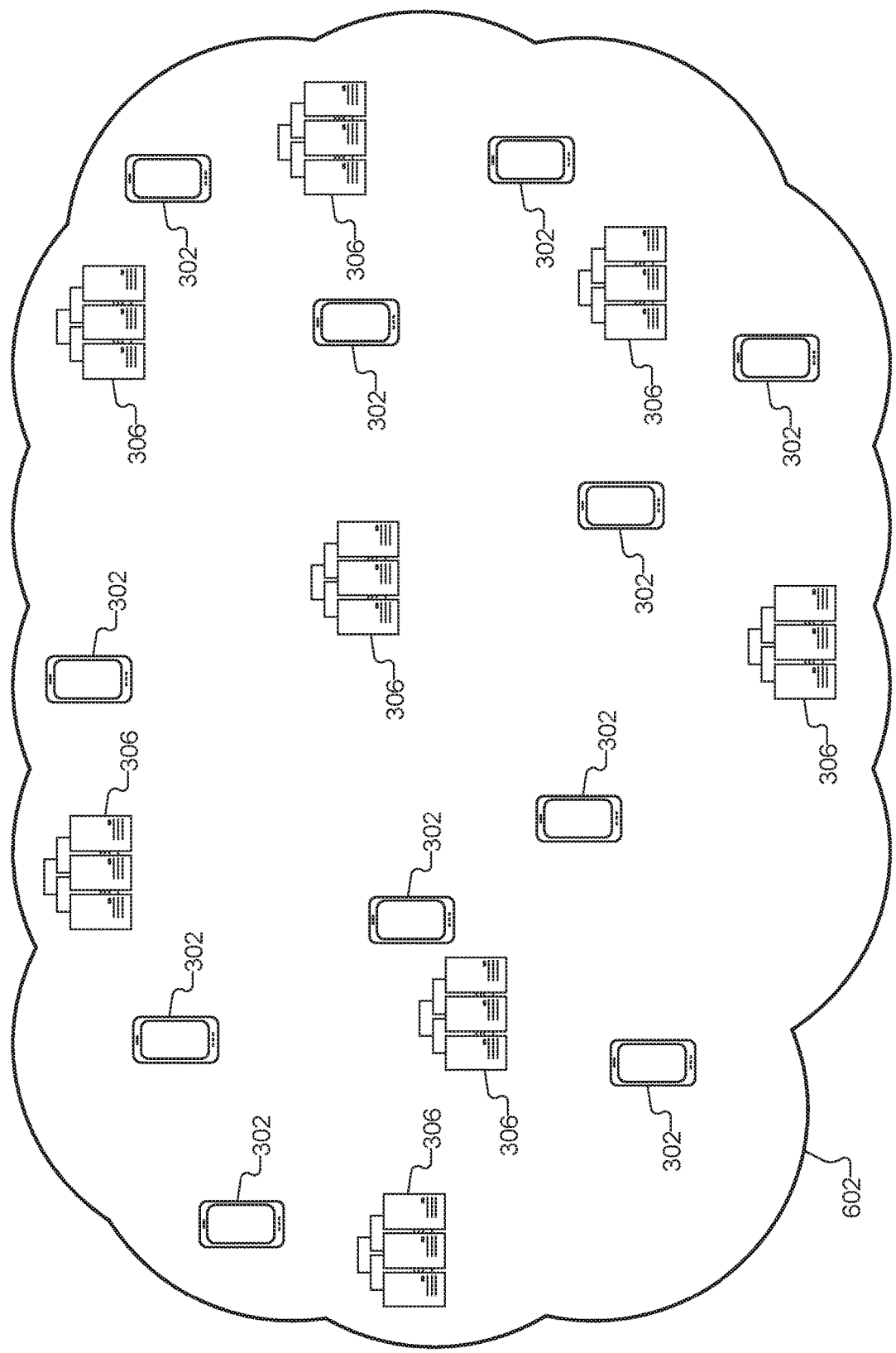
FIGS. 6-9 show an illustrative coverage area of a provider network that includes various client devices and MEC servers at various different locations within the coverage area to illustrate various examples of MEC server selection according to embodiments described herein.

To further illustrate the selection of the particular MEC server at operation 504-3, FIGS. 6-9 show an illustrative coverage area 602 of a provider network that includes various client devices 302 and MEC servers 306 at various different locations within the coverage area to illustrate various examples of MEC server selection according to principles described herein. More particularly, as shown in FIG. 6, coverage area 602 represents a geographic area that could be relatively small (e.g., a small city, an amusement park, etc.) or relatively large (e.g., a footprint covering an entire country or continent such as for a nationwide network extending across the United States). A first set of locations within coverage area 602 is represented by the locations at which client devices 302 are depicted and a second set of locations within coverage area 602 is represented by the locations at which MEC servers 306 are depicted. While, as described above, latency may be affected by various conditions and factors, it will be assumed for the examples of FIGS. 6-9 that latency between a client device 302 and a MEC server 306 can be suitably approximated by the geographic distance between them as the distance is depicted in the figures. While a relatively small number of client devices 302 and MEC servers 306 are illustrated in FIGS. 6-9, it will be understood that a particular provider network and coverage area may include any suitable number of these components (e.g., millions of client devices 302, thousands of MEC servers 306, etc.)

In FIG. 6, each client device 302 and MEC server 306 are explicitly labeled to indicate that any of client devices 302 may be included within a set of client devices 302 that are to engage in an multi-client application, and to represent a full set of MEC servers 306 from which a candidate subset of MEC servers (and ultimately an individual MEC server 306 that will execute the multi-client application) may be selected. However, while other figures similar to FIG. 6 may depict all of the same client devices and MEC servers as FIG. 6, these figures only label certain client devices 302 and/or MEC servers 306 in accordance with specific examples being illustrated. For example, only client devices 302 that are included in the set of client devices engaging in a multi-client application and only a particular MEC server 306 that has been selected to execute the multi-client application in the specific examples are explicitly labeled in FIGS. 7-9.

Figure 7:
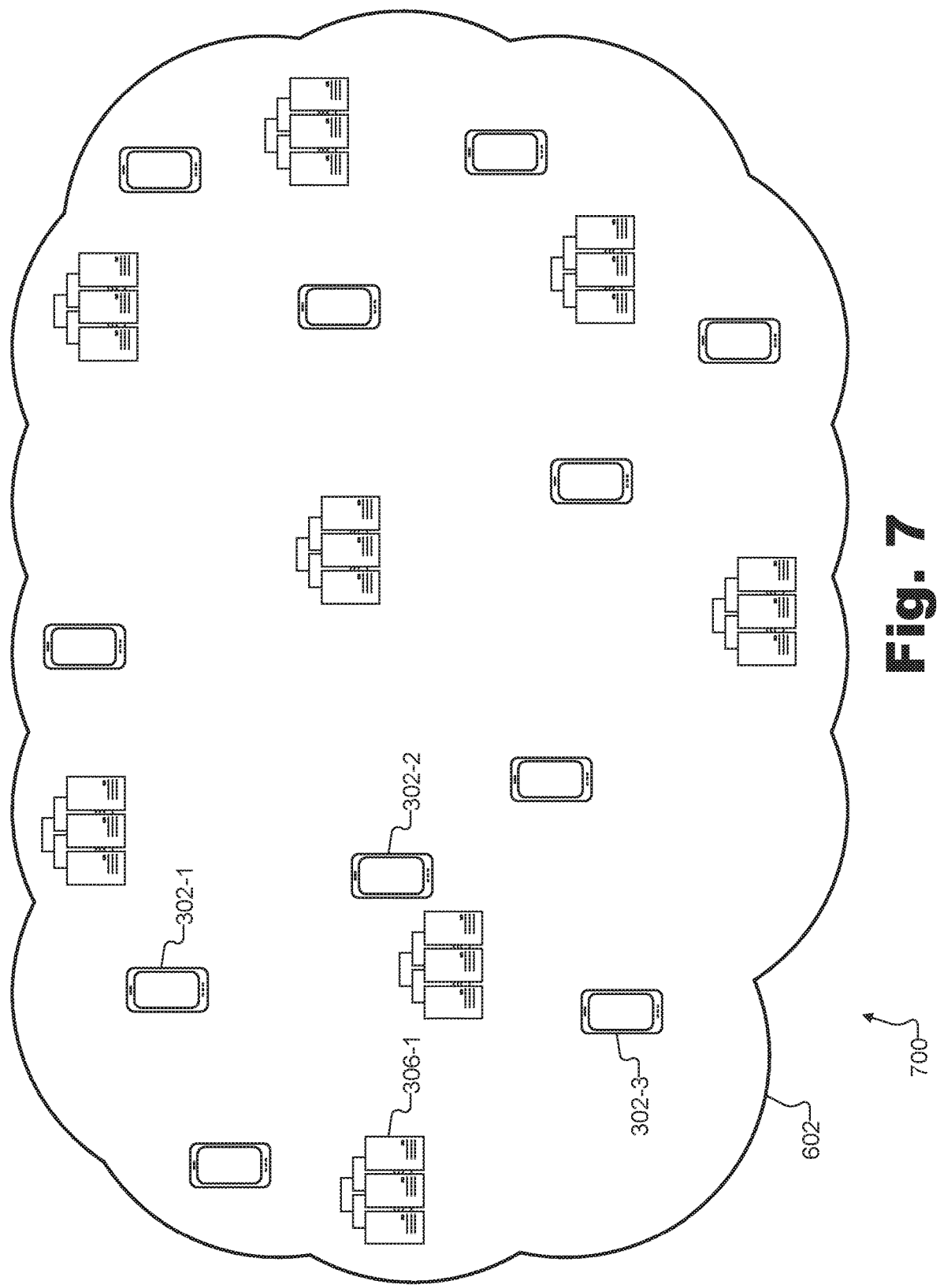

In accordance with this notation, FIG. 7 illustrates a first example 700 in which system 100 performs operation 504-3 to select a particular MEC server 306 in accordance with a latency equalization optimization policy. For instance, example 700 may represent a multi-player video game scenario in which fair play dictates that no player have significantly shorter latency than any other player. In example 700, the reported performance capabilities of each MEC server 306 tested at communication 502-6 and reported at communication 502-7 may include performance capabilities indicating respective communication latencies of the MEC server 306 with respect to each client device 302 in a set of three exemplary client devices labeled client devices 302-1, 302-2, and 302-3 in FIG. 7. For example, several or all of the MEC servers shown in FIG. 6 may be identified to be included within the candidate subset of MEC servers 306, and reported performance capabilities associated with each of these MEC servers 306 may be obtained by system 100.

Based on the reported performance capabilities from multiple MEC servers 306, system 100 may perform the selecting of a particular MEC server 306-1 at operation 504-3. For example, particular MEC server 306-1 may be selected in accordance with a latency equalization optimization policy by determining (e.g., based on respective communication latencies of each MEC server 306 of the candidate subset of MEC servers 306) a respective latency discrepancy metric for each MEC server 306, and selecting, as the particular MEC server to execute the multi-client application, MEC server 306-1 as the MEC server 306 having a lowest latency discrepancy metric of the candidate subset of MEC servers.

As shown, MEC server 306-1 is approximately equidistant from each of the client devices 302-1 through 302-3 in the set of client devices that are to engage in the multi-client application. Accordingly, as described above, MEC server 306-1 may be selected as the MEC server that best accords with the latency equalization optimization policy (i.e., as the MEC server that will provide the most similar latency for each client device 302 in the set of client devices 302-1 through 302-3), even though MEC server 306-1 may not necessarily provide the shortest latency for all of client devices 302 in the set (e.g., because certain client devices 302 in the set are significantly closer to other MEC servers 306). It will be understood that before system 100 identifies MEC server 306-1 as the final selection of operation 504-3, system 100 may ensure that the real-time performance of MEC server 306-1 is adequate to satisfy any or all of the operation parameters associated with the multi-client application. If one or more such operation parameters were to be determined to not be currently satisfied by MEC server 306-1, system 100 may instead select a different MEC server 306 that most closely accords with the latency equalization optimization policy.

Figure 8:
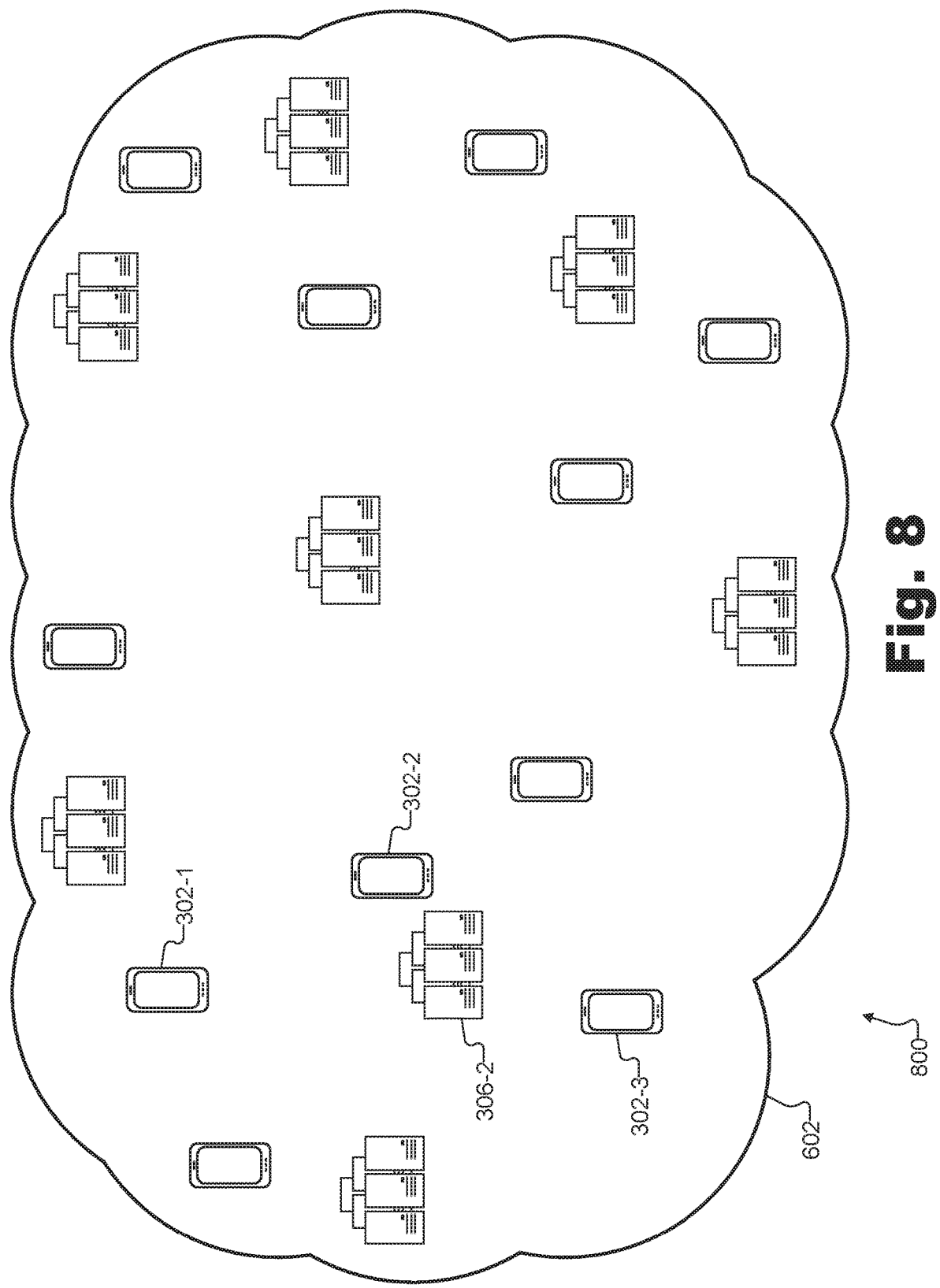

FIG. 8 illustrates a different example 800 in which system 100 performs operation 504-3 to select a particular MEC server 306 in accordance with a latency minimization optimization policy. For instance, example 800 may represent a non-competitive multi-user extended reality experience in which it is desirable for each user to simply have the shortest latency possible, regardless of what latency is provided to other users. As with example 700, the reported performance capabilities tested and reported for the MEC servers in example 800 may include performance capabilities indicating respective communication latencies of each MEC server 306 with respect to each client device 302 in the set of client devices 302-1 through 302-3.

However, in this example, the reported performance capabilities for the candidate subset of MEC servers 306 may cause system 100 to perform the selecting of a MEC server 306-2 (rather than MEC server 306-1) at operation 504-3. For example, particular MEC server 306-2 may be selected in accordance with a latency minimization optimization policy by determining (e.g., based on the respective communication latencies of each MEC server 306 of the candidate subset of MEC servers 306) a respective maximum latency metric for each MEC server 306, and selecting, as the particular MEC server to execute the multi-client application, MEC server 306-2 as the MEC server 306 having a lowest maximum latency metric of the candidate subset of MEC servers.

As shown, MEC server 306-2 is not equidistant from each of the client devices 302-1 through 302-3 in the set of client devices that are to engage in the multi-client application (e.g., MEC server is significantly closer to client device 302-2 than to client devices 302-1 and 302-3). However, because MEC server 306-2 is at least somewhat closer to all of client devices 302-1 through 302-3 (e.g., resulting in MEC server 306-2 having maximum latency metrics for all of the client devices that are slightly lower than corresponding maximum latency metrics of, for example, MEC server 306-1), MEC server 306-2 may be selected as the MEC server that best accords with the latency minimization optimization policy (i.e., as the MEC server that will provide the shortest latency for each client device 302 in the set of client devices 302). As described above in relation to example 700, it will be understood that before system 100 identifies MEC server 306-2 as the final selection of operation 504-3, system 100 may ensure that the real-time performance of MEC server 306-2 is adequate to satisfy any or all of the operation parameters associated with the multi-client application. If one or more such operation parameters were to be determined to not be currently satisfied by MEC server 306-2, system 100 may instead select a different MEC server 306 that most closely accords with the latency minimization optimization policy.

While examples 700 and 800 show two illustrative optimization policies for a specific configuration of client devices 302 and MEC servers 306 at particular locations, it will be understood that similar principles may be applied in other examples to implement other optimization policies or to implement these optimization policies in different scenarios (e.g., more complex scenarios with more components and/or larger sets or subsets, scenarios involving different locations of the components, etc.).

Returning to FIG. 5, at communication 502-8, system 100 may instantiate the multi-client application on the particular MEC server 306 that was selected at operation 504-3 as described above (e.g., MEC server 306-1 for the latency equalization optimization policy, MEC server 306-2 for the latency minimization optimization policy, etc.). As such, at operation 504-4, the selected MEC server 306 and the set of client devices 302 may communicate with one another as the multi-client application executes on the MEC server 306, the corresponding applications execute on the respective client devices 302, and the client devices 302 and MEC server 306 interoperate to provide the benefits of the multi-client application to the users of the client devices 302 (e.g., to allow the users to engage in the multi-player video game, the multi-user extended reality experience, the group video call, etc.).

In some implementations and/or scenarios, performance 500 of FIG. 5 may terminate (END) once the particular MEC server 306 is selected and the multi-client application is executing at operation 504-4. However, in other implementations and/or scenarios, it may be desirable to reperform some or all of the communications and operations of FIG. 5 (e.g., periodically or based on a trigger event) even as the multi-client application is executing. For example, there could be a significant change in one or more of the real-time performance capabilities of the selected MEC server 306 (e.g., a change of MEC resources available for use in executing the multi-client application) due to an increase in network traffic, an increase in other processing tasked to the MEC server 306, or the like. As another example, the operating parameters may change such as if the set of client devices 302 engaging in the multi-client application is altered to include more or fewer client devices 302 in the group. As yet another example, one or more of the client devices 302 may move to a different geographical location that affects the latency (or another key performance indicator) that the selected MEC server 306 is capable of providing to those client devices 302.

In any of these scenarios, it may be desirable for performance 500 to be reperformed (RETURN TO START) rather than to terminate (END). For example, system 100 may be configured to detect (e.g., subsequent to the instantiating of the multi-client application at communication 502-8 and while the multi-client application is executing on the particular MEC server at operation 504-4) a trigger event involving the particular MEC server 306 or the set of client devices 302. The trigger event may involve any of the changes described above to the performance capabilities, operating parameters, network conditions, participating client devices, or the like. Then, in response to the trigger event (e.g., and while the multi-client application continues executing on the particular MEC server 306 at operation 504-4), system 100 may reorchestrate a selection of a different MEC server that is to execute the multi-client application instead of the particular MEC server. For example, this reorchestrating may include repeating some or all of the communications 502 and operations 504 shown in FIG. 5 (e.g., to reperform the obtaining of the operation parameters, the identifying of the candidate subset of MEC servers 306, the directing of the set of client devices 302 to test and report the performance capabilities, and the selecting of the new MEC server 306 to which the execution of the multi-client application is to switch).

Figure 9:
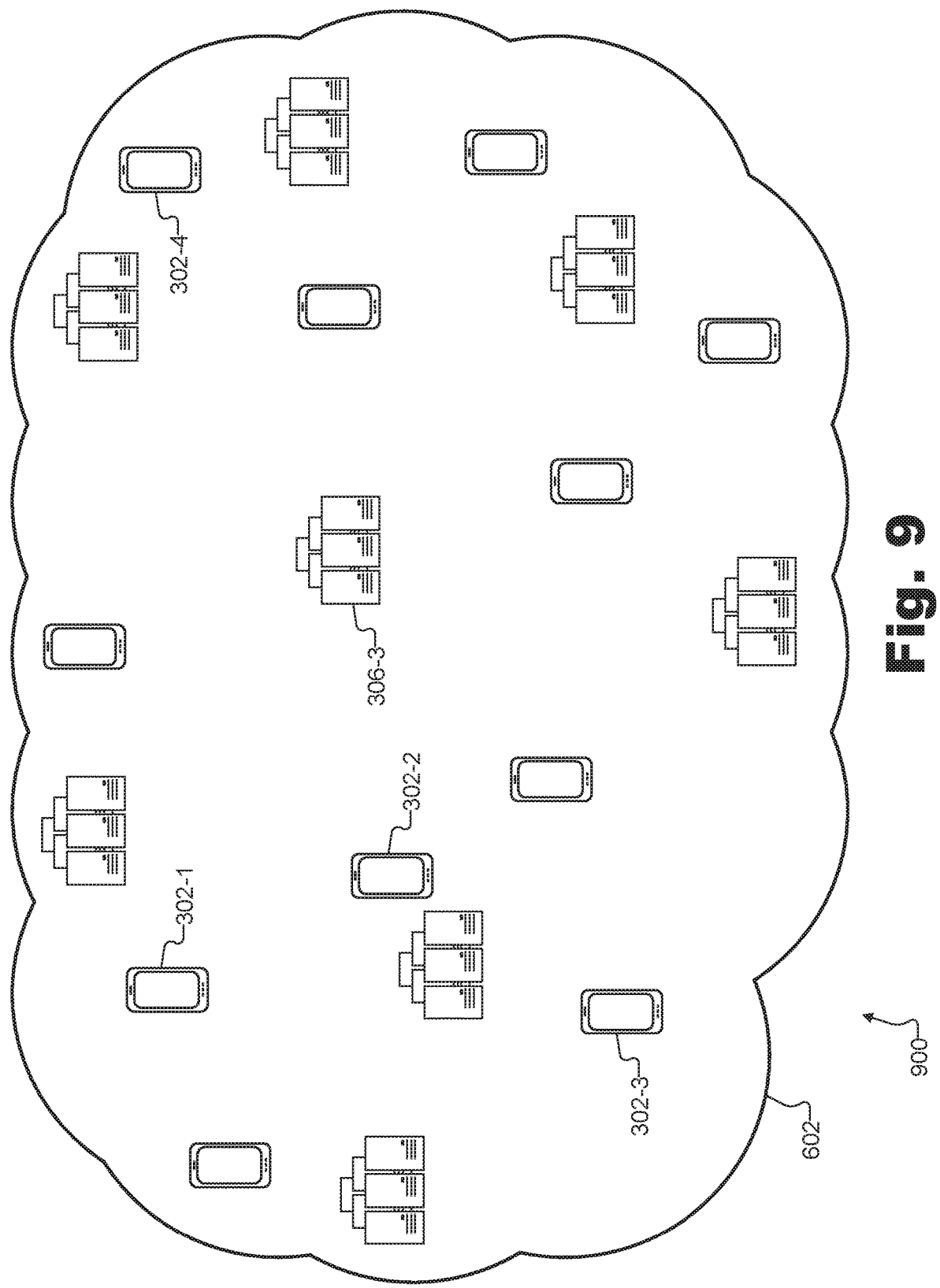

To illustrate, FIG. 9 shows an example 900 in which client devices 302-1 through 302-3 continue to be in the set of client devices 302 engaging in the multi-client application, but in which a fourth client device 302-4 located in a significantly different geographical location from the other devices has joined the multi-client application. This scenario may represent, for example, three players on the west coast playing a video game and a fourth player on the east coast joining the game. For various optimization equalization policies (e.g., including the latency equalization and latency minimization optimization policies described above), neither MEC server 306-1 nor MEC server 306-2 may be optimal for executing the multi-client application once client device 302-4 has joined the set of client devices engaging in the multi-client application. Accordingly, upon reorchestrating the selection of the particular MEC server 306 to execute the multi-client application, a MEC server 306-3 may be selected and the multi-client application may be instantiated on MEC server 306-3 instead of on MEC servers 306-1 or 306-2. In this manner, all of the client devices 302 in the set (including the newly joining client device 302-4) may be accounted for to equalize the latencies or other key performance indicators, to minimize the maximum latencies or other key performance indicators, or to otherwise accord with a given optimization policy.

While the joining of the group by client device 302-4 may constitute a trigger event that causes system 100 to reorchestrate the MEC server selection in some implementations, it will be understood that, in the same or other implementations, such reorchestration may be performed automatically (e.g., on a periodic basis) even if no specific trigger event is detected. For instance, in addition or as an alternative to the trigger events described above, system 100 may periodically reorchestrate (e.g., subsequent to the instantiating of the multi-client application at communication 502-8 and while the multi-client application is executing as part of operation 504-4) a selection of a different MEC server 306 that is to begin executing the multi-client application instead of the MEC server 306 that was selected previously (e.g., MEC server 306-3 rather than MEC servers 306-1 or 306-2 in example 900). This periodic reorchestrating may include repeating, at set periodic intervals (e.g., once per second, once per minute, etc.), some or all of the communications 502 and operations 504 shown in FIG. 5 (e.g., so as to reperform the obtaining of the operation parameters, the identifying of the candidate subset of MEC servers 306, the directing of the set of client devices 302 to test and report the performance capabilities, and/or the selecting of the new MEC server 306-3 to which the execution of the multi-client application is to switch).

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory (DRAM), which typically constitutes a main memory. Common forms of computer-readable media include, for example, a disk, hard disk, magnetic tape, any other magnetic medium, a compact disc read-only memory (CD-ROM), a digital video disc (DVD), any other optical medium, random access memory (RAM), programmable read-only memory (PROM), electrically erasable programmable read-only memory (EPROM), FLASH-EEPROM, any other memory chip or cartridge, or any other tangible medium from which a computer can read.

Figure 10:
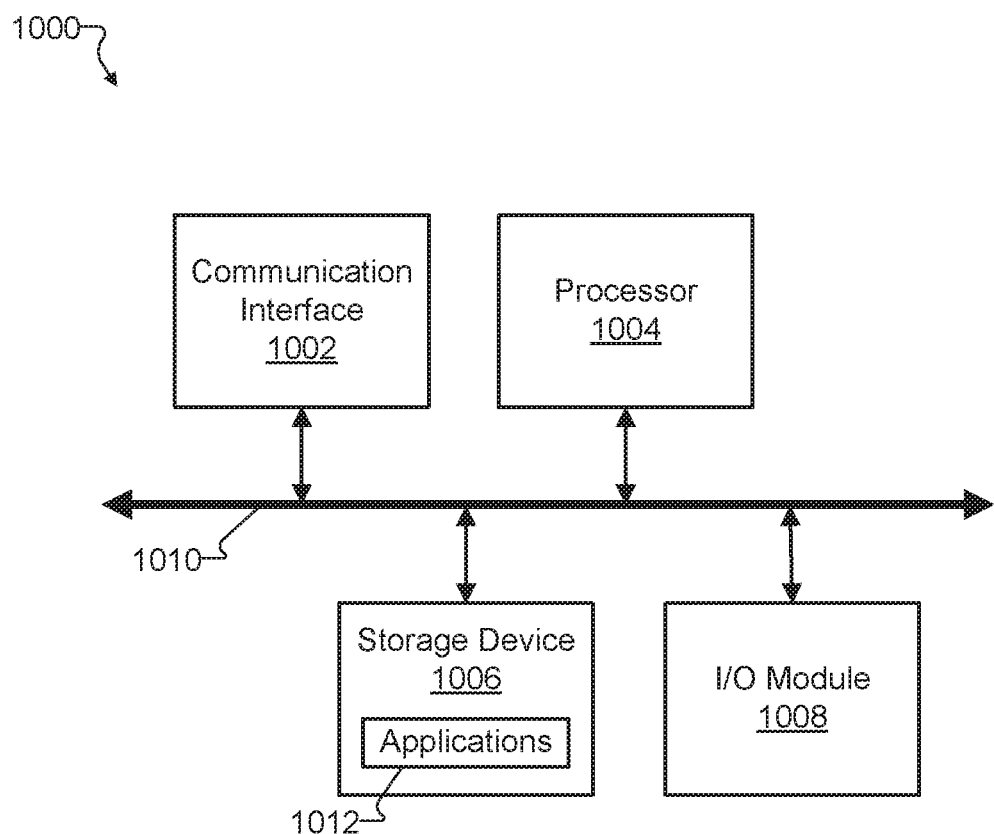
FIG. 10 illustrates an exemplary computing device according to embodiments described herein.

FIG. 10 illustrates an exemplary computing device 1000 that may be specifically configured to perform one or more of the processes described herein. For example, computing system 1000 may include or implement (or partially implement) a MEC orchestration system such as system 100, an application controller system such as application controller system 410, a MEC selection system such as MEC selection system 402, a MEC server such as one of MEC servers 306, a client device such as one of client devices 302, or any other computing systems or devices described herein.

As shown in FIG. 10, computing system 1000 may include a communication interface 1002, a processor 1004, a storage device 1006, and an input/output (I/O) module 1008 communicatively connected via a communication infrastructure 1010. While an illustrative computing system 1000 is shown in FIG. 10, the components illustrated in FIG. 10 are not intended to be limiting. Additional or alternative components may be used in other embodiments. Components of computing system 1000 shown in FIG. 10 will now be described in additional detail.

Communication interface 1002 may be configured to communicate with one or more computing devices. Examples of communication interface 1002 include, without limitation, a wired network interface (such as a network interface card), a wireless network interface (such as a wireless network interface card), a modem, an audio/video connection, and any other suitable interface.

Processor 1004 generally represents any type or form of processing unit capable of processing data or interpreting, executing, and/or directing execution of one or more of the instructions, processes, and/or operations described herein. Processor 1004 may direct execution of operations in accordance with one or more applications 1012 or other computer-executable instructions such as may be stored in storage device 1006 or another computer-readable medium.

Storage device 1006 may include one or more data storage media, devices, or configurations and may employ any type, form, and combination of data storage media and/or device. For example, storage device 1006 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 1006. For example, data representative of one or more executable applications 1012 configured to direct processor 1004 to perform any of the operations described herein may be stored within storage device 1006. In some examples, data may be arranged in one or more databases residing within storage device 1006.

I/O module 1008 may include one or more I/O modules configured to receive user input and provide user output. One or more I/O modules may be used to receive input for a single virtual experience. I/O module 1008 may include any hardware, firmware, software, or combination thereof supportive of input and output capabilities. For example, I/O module 1008 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1008 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing system 1000. For example, one or more applications 1012 residing within storage device 1006 may be configured to direct processor 1004 to perform one or more processes or functions associated with processor 104 of system 100. Likewise, memory 102 of system 100 may be implemented by or within storage device 1006.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various illustrative embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
obtaining, by a multi-access edge computing (MEC) orchestration system, an operation parameter of a multi-client application, wherein the multi-client application:
is configured to execute on a particular MEC server to be selected from a set of MEC servers located at a set of locations within a coverage area of a provider network, and
is configured, when executing, to serve a first client application executing on a first client device located at a first location within the coverage area and to serve a second client application executing on a second client device located at a second location within the coverage area;
identifying, by the MEC orchestration system and based on the operation parameter, a first MEC server and a second MEC server selected from the set of MEC servers as candidates for the particular MEC server on which the multi-client application executes;
directing, by the MEC orchestration system, the first client device to test and report a first communication latency of the first MEC server with respect to the first client device;
directing, by the MEC orchestration system, the second client device to test and report a second communication latency of the first MEC server with respect to the second client device;
directing, by the MEC orchestration system, the first client device to test and report a third communication latency of the second MEC server with respect to the first client device;
directing, by the MEC orchestration system, the second client device to test and report a fourth communication latency of the second MEC server with respect to the second client device;
determining, by the MEC orchestration system and based on the first and second communication latencies, a first latency-related metric for the first MEC server;
determining, by the MEC orchestration system and based on the third and fourth communication latencies, a second latency-related metric for the second MEC server; and
selecting, by the MEC orchestration system based on the first and second latency-related metrics, one of the first or second MEC servers to be the particular MEC server on which the multi-client application executes.

2. The method of claim 1, wherein:
the first latency-related metric is a first latency discrepancy metric;
the second latency-related metric is a second latency discrepancy metric; and
the selecting of one of the first or second MEC servers to be the particular MEC server is performed in accordance with a latency equalization optimization policy by:
selecting the first MEC server if the first latency discrepancy metric is lower than the second latency discrepancy metric, and
selecting the second MEC server if the second latency discrepancy metric is lower than the first latency discrepancy metric.

3. The method of claim 1, wherein:
the first latency-related metric is a first maximum latency metric;
the second latency-related metric is a second maximum latency metric; and
the selecting of one of the first or second MEC servers to be the particular MEC server is performed in accordance with a latency minimization optimization policy by:
selecting the first MEC server if the first maximum latency metric is lower than the second maximum latency metric, and
selecting the second MEC server if the second maximum latency metric is lower than the first maximum latency metric.

4. The method of claim 1, wherein the identifying of the first and second MEC servers is further based on one or more factors from a group of factors including:
a real-time availability of each MEC server of the set of MEC servers;
an average proximity of each MEC server of the set of MEC servers to each client device of the set of client devices; or
a centrality of each location of the set of locations with respect to the first and second locations.

5. The method of claim 4, wherein the identifying of the first and second MEC servers includes analyzing at least one of the one or more factors using machine learning technology.

6. The method of claim 1, further comprising instantiating, by the MEC orchestration system based on the selecting of one of the first or second MEC servers to be the particular MEC server, the multi-client application on the particular MEC server.

7. The method of claim 6, further comprising periodically reorchestrating, by the MEC orchestration system subsequent to the instantiating of the multi-client application and while the multi-client application is executing on the particular MEC server, a selection of a different MEC server that is to execute the multi-client application instead of the particular MEC server.

8. The method of claim 6, further comprising:
detecting, by the MEC orchestration system subsequent to the instantiating of the multi-client application and while the multi-client application is executing on the particular MEC server, a trigger event involving the particular MEC server or the set of client devices; and
reorchestrating, by the MEC orchestration system in response to the trigger event and while the multi-client application is executing on the particular MEC server, a selection of a different MEC server that is to execute the multi-client application instead of the particular MEC server.

9. The method of claim 1, wherein the directing of the first client device to test and report the first communication latency of the first MEC server with respect to the first client device includes:

directing the first MEC server to execute a daemon process configured to facilitate a latency test performed by the first client device; and providing, to the first client device:
   address information associated with the daemon process executing on the first MEC server, and
   protocol information indicating a supported transport protocol that is to be utilized by the first client device to communicate with the daemon process to enable testing of the first communication latency.

10. The method of claim 1, wherein the operation parameter of the multi-client application includes one or more of:
   a round-trip latency parameter for the multi-client application,
   a one-way latency parameter for the multi-client application,
   an uplink bandwidth parameter for the multi-client application,
   a downlink bandwidth parameter for the multi-client application,
   a packet loss parameter for the multi-client application, or
   a packet jitter parameter for the multi-client application.

11. A system comprising:
   a memory storing instructions; and
   a processor communicatively coupled to the memory and configured to execute the instructions to:
      obtain an operation parameter of a multi-client application, wherein the multi-client application:
         is configured to execute on a particular multi-access edge computing (MEC) server to be selected from a set of MEC servers located at a set of locations within a coverage area of a provider network, and
         is configured, when executing, to serve a first client application executing on a first client device located at a first location within the coverage area and to serve a second client application executing on a second client device located at a second location within the coverage area;
      identify, based on the operation parameter, a first MEC server and a second MEC server selected from the set of MEC servers as candidates for the particular MEC server on which the multi-client application executes;
      direct the first client device to test and report a first communication latency of the first MEC server with respect to the first client device;
      direct the second client device to test and report a second communication latency of the first MEC server with respect to the second client device;
      direct the first client device to test and report a third communication latency of the second MEC server with respect to the first client device;
      direct the second client device to test and report a fourth communication latency of the second MEC server with respect to the second client device;
      determine, based on the first and second communication latencies, a first latency-related metric for the first MEC server;
      determine, based on the third and fourth communication latencies, a second latency-related metric for the second MEC server; and
      select, based on the first and second latency-related metrics, one of the first or second MEC servers to be the particular MEC server on which the multi-client application executes.

12. The system of claim 11, wherein:
   the first latency-related metric is a first latency discrepancy metric;
   the second latency-related metric is a second latency discrepancy metric; and
   the selecting of one of the first or second MEC servers to be the particular MEC server is performed in accordance with a latency equalization optimization policy by:
      selecting the first MEC server if the first latency discrepancy metric is lower than the second latency discrepancy metric, and
      selecting the second MEC server if the second latency discrepancy metric is lower than the first latency discrepancy metric.

13. The system of claim 11, wherein the identifying of the first and second MEC servers is further based on one or more factors from a group of factors including:
   a real-time availability of each MEC server of the set of MEC servers;
   an average proximity of each MEC server of the set of MEC servers to each client device of the set of client devices; and
   a centrality of each location of the set of locations with respect to the first and second locations.

14. The system of claim 13, wherein the identifying of the first and second MEC servers includes analyzing the one or more factors upon which the identifying is based using machine learning technology.

15. The system of claim 11, wherein the processor is further configured to execute the instructions to instantiate, based on the selecting of one of the first or second MEC servers to be the particular MEC server, the multi-client application on the particular MEC server.

16. The system of claim 15, wherein the processor is further configured to execute the instructions to periodically reorchestrate, subsequent to the instantiating of the multi-client application and while the multi-client application is executing on the particular MEC server, a selection of a different MEC server that is to execute the multi-client application instead of the particular MEC server.

17. The system of claim 15, wherein the processor is further configured to execute the instructions to:
   detect, subsequent to the instantiating of the multi-client application and while the multi-client application is executing on the particular MEC server, a trigger event involving the particular MEC server or the set of client devices; and
   reorchestrate, in response to the trigger event and while the multi-client application is executing on the particular MEC server, a selection of a different MEC server that is to execute the multi-client application instead of the particular MEC server.

18. The system of claim 11, wherein the directing of the first client device to test and report the first communication latency of the first MEC server with respect to the first client device includes:
   directing the first MEC server to execute a daemon process configured to facilitate a latency test performed by the first client device; and
   providing, to the first client device:
      address information associated with the daemon process executing on the first MEC server, and
      protocol information indicating a supported transport protocol that is to be utilized by the first client device to communicate with the daemon process to enable testing of the first communication latency.

19. The system of claim 11, wherein the operation parameter of the multi-client application includes one or more of:
- a round-trip latency parameter for the multi-client application,
- a one-way latency parameter for the multi-client application,
- an uplink bandwidth parameter for the multi-client application,
- a downlink bandwidth parameter for the multi-client application,
- a packet loss parameter for the multi-client application, or
- a packet jitter parameter for the multi-client application.

20. A system comprising:
- an application controller system configured to:
  - transmit an orchestration request for selection of a particular multi-access edge computing (MEC) server from a set of MEC servers located at a first set of locations within a coverage area of a provider network, and
  - provide, as part of the orchestration request, an operation parameter of a multi-client application that is configured to execute on the particular MEC server and that is configured, when executing, to serve a first client application executing on a first client device located at a first location within the coverage area and to serve a second client application executing on a second client device located at a second location within the coverage area; and
- an MEC orchestration system configured to:
  - receive the orchestration request transmitted by the application controller system,
  - identify, based on the operation parameter, a first MEC server and a second MEC server selected from the set of MEC servers as candidates for the particular MEC server on which the multi-client application executes,
  - direct the first client device to test and report a first communication latency of the first MEC server with respect to the first client device,
  - direct the second client device to test and report a second communication latency of the first MEC server with respect to the second client device,
  - direct the first client device to test and report a third communication latency of the second MEC server with respect to the first client device,
  - direct the second client device to test and report a fourth communication latency of the second MEC server with respect to the second client device,
  - determine, based on the first and second communication latencies, a first latency-related metric for the first MEC server,
  - determine, based on the third and fourth communication latencies, a second latency-related metric for the second MEC server, and
  - select, based on the first and second latency-related metrics, one of the first or second MEC servers to be the particular MEC server on which the multi-client application executes.

* * * * *